United States Patent [19]

Schuetz et al.

[11] Patent Number: 5,069,603
[45] Date of Patent: Dec. 3, 1991

[54] BEARINGS FOR USE IN NEGATIVE-PRESSURE ENVIRONMENTS

[75] Inventors: Guenter Schuetz; Hans-Guenter Stueber, both of Koeln; Volker Kinzig, Geinhausen, all of Fed. Rep. of Germany

[73] Assignee: Leybold Aktiengesellschaft, Fed. Rep. of Germany

[21] Appl. No.: 688,840

[22] Filed: Apr. 22, 1991

Related U.S. Application Data

[63] Continuation of Ser. No. 396,514, Aug. 21, 1989, Pat. No. 5,028,219.

[30] Foreign Application Priority Data

Aug. 11, 1989 [DE] Fed. Rep. of Germany ....... 3926577

[51] Int. Cl.$^5$ .................. F04B 39/02; F16C 33/62
[52] U.S. Cl. ..................... 417/423.4; 417/423.13; 384/492; 384/518; 384/907
[58] Field of Search ............... 417/281, 423.4, 423.12, 417/423.13; 384/491, 492, 517, 518, 907, 913, 907.1

[56] References Cited

U.S. PATENT DOCUMENTS

| 4,093,397 | 6/1978 | Lovelady | 417/423.4 |
| 4,140,441 | 2/1979 | Patterson | 417/423.4 |
| 4,327,139 | 4/1982 | Schaefer et al. | 428/900 |
| 4,529,324 | 6/1985 | Champagne et al. | 384/518 |
| 4,652,219 | 3/1987 | McEachern, Jr. et al. | 384/518 |
| 4,770,549 | 9/1988 | Rokraku | 384/907.1 |
| 4,792,244 | 12/1988 | Yamashita et al. | 384/492 |

FOREIGN PATENT DOCUMENTS

| 2119857 | 11/1972 | Fed. Rep. of Germany . |
| 2309665 | 9/1974 | Fed. Rep. of Germany . |
| 2947066 | 6/1981 | Fed. Rep. of Germany . |

Primary Examiner—Richard A. Bertsch
Assistant Examiner—David L. Cavanaugh
Attorney, Agent, or Firm—Hill, Van Santen, Steadman & Simpson

[57] ABSTRACT

A vacuum pump includes a rotor and at least one bearing that is supplied with a lubricant and that is situated, during operation, in a negative-pressure environment. In order to extend the useful life of the bearing, it is proposed that the bearing is formed from a ceramic material.

6 Claims, 1 Drawing Sheet

BEARINGS FOR USE IN NEGATIVE-PRESSURE ENVIRONMENTS

This is a continuation of application Ser. No. 396,514, filed Aug. 21, 1989 now U.S. Pat. No. 5,028,219.

TECHNICAL FIELD

The invention is directed to a vacuum pump that includes a rotor and at least one bearing that is supplied with a lubricant and that is situated, during operation, in a negative-pressure environment.

BACKGROUND OF THE INVENTION

Lubrication of bearings that are subject to a negative-pressure environment during operation is problematical, since the lubricants generally employed are not vacuum-resistant over the long term and gradually volatilize. Such volatilization occurs regardless of whether lubricating greases or lubricating oils are used and thus lubrication of the contact members of the bearings is not always guaranteed. One consequence of a lack of lubrication is intensified frictional phenomena or "cold welding" between the rolling members and bearing rings, which leads to increased bearing wear and, thus, to a reduced useful life for the bearing. When bearings operate in a vacuum, it is impossible to avoid a lubricant deficiency merely by supplying large amounts of lubricant, because excessive quantities of lubricant lead to an increased formation of lubricant vapor. If these lubricant vapors proceed into the vacuum produced by the pump, they can deteriorate or even contaminate pump components. Moreover, the rotors of vacuum pumps are frequently operated at extremely high speeds, so that excess quantities of lubricant lead to an additional bearing stress. The above described problems are of particular significance in turbomolecular vacuum pumps, whose rotors are operated at 60,000 revolutions per minute and above. Attempts have been previously made to resolve these problems by precisely metering the quantity of lubricant supplied to the bearings. Examples of such solutions are disclosed in German Published Applications 21 19 857, 23 09 665 and 29 47 066.

SUMMARY OF THE INVENTION

A primary object of the present invention is to equip a vacuum pump, of the type including a rotor and at least one bearing t hat operates in a negative-pressure environment, with a bearing that is significantly better suited for operation in a vacuum.

This and other objects are inventively achieved in that the bearing or bearings of the vacuum pump that operate in a negative-pressure section of the pump are ceramic bearings. One advantage of using ceramic bearings is that their operational temperatures are low in comparison to steel bearings previously employed. This means that less lubricant volatilizes, so that the risk of interrupting the minimum lubricant film between contact members of a rapidly rotating vacuum pump is significantly lower. Despite lesser quantities of lubricant, adequate lubrication of the bearings can be more likely ensured than with steel bearings. Moreover, "cold welding" can no longer occur, and thus the increased frictional and sliding phenomena, increased bearing temperatures, and increased bearing wear common with steel bearings are avoided. The ceramic bearings of the present invention achieve considerable extension of the useful life of the bearings.

In addition to the advantages set forth hereinabove, the ceramic bearing forms an electrical insulation between the rotor and the housing of the vacuum pump. Electrical currents that may lead to bearing damage can therefore no longer flow through the bearing. Such currents arise when a vacuum pump, particularly a turbomolecular pump, is operated in a magnetic field; for example, in nuclear power plants or in the proximity of magnets of accelerators.

Yet another advantage of the present invention lies in that reliable bearing lubrication allows the vacuum pumps to be operated at higher speeds, which results in an improvement of the pump performance particularly of the pumping capacity.

In a preferred embodiment of the present invention, the bearing operated in a negative-pressure environment is a rolling bearing including rolling members and inside and outside bearing rings. Only the rolling members are composed of ceramic. Since ceramic rolling members are lighter in weight than steel rolling members, the centrifugal forces acting on the bearings and, thus, the inner bearing stresses are lower. Consequently, lower setting forces are required in spindle bearings for setting a defined thrust angle. Reduced settling forces result in a reduction in the surface pressure and of the frictional forces generated by the bearings during pump operation. Fluctuations in thrust angle that are harmful, particularly at extremely high speeds, are also reduced.

Further advantages and details of the invention will become apparent upon reference to the accompanying description, when taken in conjunction with the following drawings.

DETAILED DESCRIPTION OF THE PREFERRED EMBODIMENTS

Figure 1:
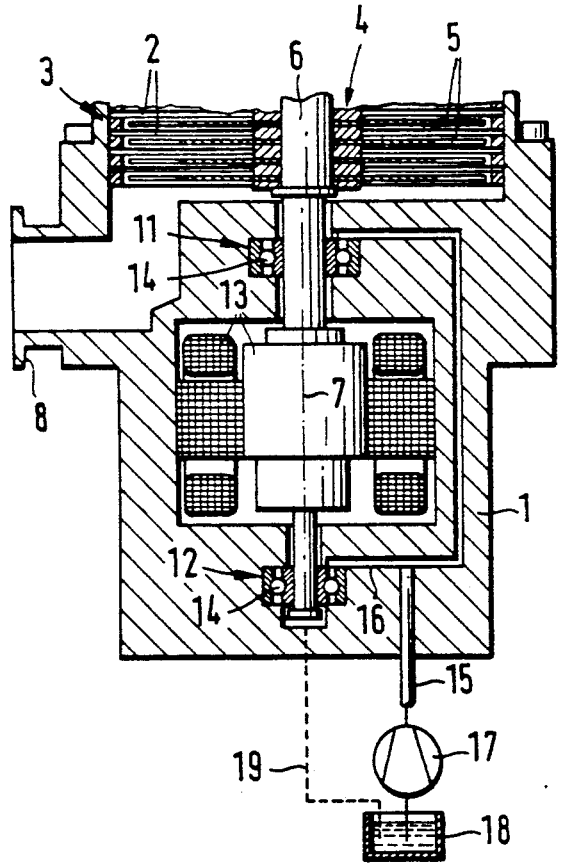
FIG. 1 is a partial section through a turbomolecular vacuum pump embodying the present invention.

FIG. 1 shows a section through the lower part of a turbomolecular vacuum pump including a pump housing 1, a stator 3 equipped with stator paddles 2, and a rotor 4 having rotor paddles 5. A shaft 6 having an axis 7 is a component part of the rotor 4. The rotor paddles 5 are secured to the shaft 6. The stator paddles 2 and the rotor paddles 5 are set such that a gas is conveyed from a pump inlet (not shown) to a pump discharge orifice 8.

The rotor shaft 6 is rotatably seated in the housing 1 of the turbomolecular pump by means of rolling bearings 11 and 12. A drive motor 13 is situated between these bearings. Since a backing pump is connected to the discharge orifice 8, the space in which the bearings 11, 12 and the motor 13 are situated is subject to negative pressure during the operation of the pump.

The bearings 11, 12 are fashioned as ceramic bearings, i.e. at least the rolling members 14 of these two bearings—preferably balls—are composed of ceramic material. It has been found that ceramic components manufactured using a hot-pressing process or an isostatic pressing process, preferably likewise under heat, are especially suited for use in rolling bearings because of the surface properties such processes impart.

The rolling bearings 11, 12 are oil-lubricated. An oil circulation system is provided that includes an oil duct system 15, 16 Oil is supplied to this duct system in metered fashion by an oil conveying pump 17, with the oil being supplied from an oil reservoir 18. Excess oil flows back into the reservoir 18 through an oil return duct 19.

Due to the provision of ceramic bearings, the quantity of oil supplied to the bearings can be kept extremely small compared to the quantity required for conventional bearings. The bearing temperature remains low during the operation of the pump, and the volatilizing quantity of oil is therefore slight. Even if interruption of the lubricant film should occur, the wear phenomena that significantly shorten the useful life of conventional steel bearings do not occur, since ceramic bearings have especially good emergency running properties.

Figure 2:
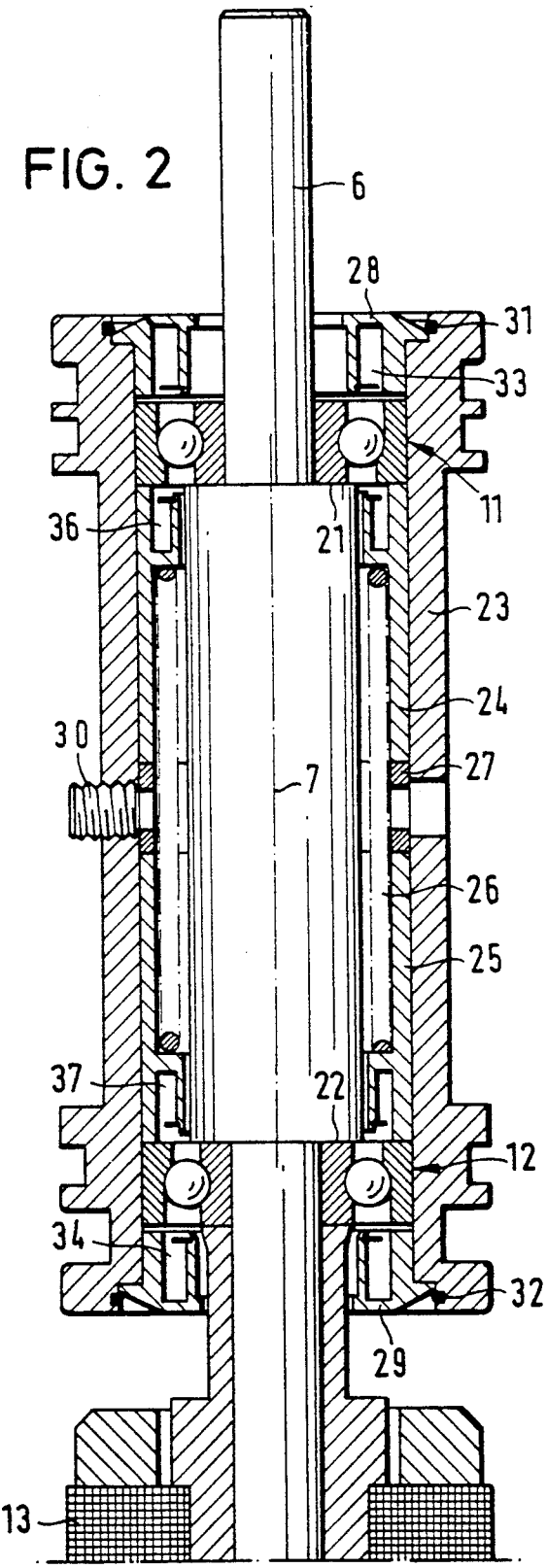
FIG. 2 is a section through a bearing spindle in a second embodiment of the present invention.

The bearing spindle shown in FIG. 2 that is suitable for employment in vacuum pumps includes spindle bearings 11, 12 that are fashioned as ceramic bearings. The inside rings of the bearings 11, 12 are supported on shoulders 21, 22 of the shaft 6. The respective outside rings press against a spindle sleeve 23 in radial direction. In axial direction, they are supported on sleeves 24, 25. The latter are guided in the housing or spindle sleeve 23. They are under the influence of a compression spring 26 that generates the setting forces for the bearings. The system composed of the shaft 6, the bearings 11, 12, the sleeves 24, 25 and the spring 26 is fixed inside the spindle sleeve 23 with the assistance of a ring 27 and of a screw 28.

The end-face termination of the spindle sleeve 23 is formed by caps 28 and 29 that are fixed with clamp rings 31, 32. Largely closed, annular grease reservoirs 3S, 34, situated in the caps 28, 29 assure long-term lubrication of the bearings 11, 12, due to the decreased demand for lubricant. The end faces of the sleeves 24, 25 that face toward the bearings 11, 12 include similar grease reservoirs 36, 37.

A particular advantage of fashioning the bearing 11, 12 as ceramic bearings is that the centrifugal forces generated by the ceramic rolling members ar lower than the centrifugal forces generated by steel rolling members. It is therefore possible to keep the setting forces for the bearings lower, i.e. to select the compression spring 26 so that its biasing force is weaker. The friction generated by the rolling members on the bearing rings is therefore lower, which results in an extension of the useful life of the bearings.

The present invention is particularly advantageous when a lubricant-supplied rolling bearing must be operated in a negative-pressure environment. Mineral oils or synthetic oils, oils free of hydrocarbons (for example, perfluoridated polyether), or greases, can be utilized as lubricants in pumps. Lubricants free of hydrocarbons are particularly useful in vacuum technology, when the gas to be conveyed or when the volume to be evacuated must be kept completely free of hydrocarbons. Compared to other lubricants, perfluoridated polyethers have poorer lubricating properties because, among other things, they lead to the formation of iron fluoride, which increases the risk of ruptures in the lubricating film between bearing contact members. As a consequence of the use of ceramic bearings in the present invention, such ruptures in the lubricating film no longer necessarily lead to premature bearing damage and are thus of lesser concern. When the ceramic bearings are fashioned as rolling bearings, then at least the rolling members should be composed of ceramic. With a bearing fashioned as a bearing spindle (see FIG. 2), again, at least the rolling members should be composed of ceramic. A separate inside bearing ring is not required when the spindle is integral with the shaft, i.e. when the shaft itself is equipped with the grooves that form the ball races. With any type of bearing employing the present invention, at least one of the bearing contact members must be composed of ceramic.

Although the present invention has been described wit reference to particular embodiments, those of ordinary skill in the art will recognize that various changes may be made thereto without departing from the scope and spirit of the invention as defined by the appended claims.

We claim:

1. A vacuum pump of the type including a rotor and at least one bearing supporting said rotor, said vacuum pump comprising the following:

said at least one bearing including a plurality of ceramic rolling members, an inside bearing ring, and an outside bearing ring located in an environment subject to negative pressure during operation of aid pump;

means for supplying lubricant to aid at least one bearing and establishing a lubricant film between said rolling members and said bearing rings;

setting means including at least one setting sleeve axially reciprocable in a housing a compression spring biasing said at least one setting sleeve at least one cap closing said housing, and lubricant reservoir means, within said setting means for supplying lubricant to aid at lest one bearing.

2. A vacuum pump of the type including a rotor and at least one bearing supporting said rotor of claim 1, wherein said lubricant reservoir means comprises at least one lubricant reservoir disposed in said at least one setting sleeve.

3. A vacuum pump o the type including a rotor and at least one bearing supporting said rotor of claim 1, wherein said lubricant reservoir means comprises at least one lubricant reservoir disposed in said at least one cap.

4. A vacuum pump of the type including a rotor and at least one bearing supporting said rotor of claim 2, wherein said lubricant reservoir means comprises at least one lubrican reservoir disposed in said at least one cap.

5. A vacuum pump according to claim 1 further wherein said at least one bearing is a spindle bearing, and said rolling members comprises a plurality of balls.

6. A vacuum pump according to claim 5 further wherein said lubricant is perfluoridated polyether.

* * * * *